(12) United States Patent
Katagiri et al.

(10) Patent No.: US 7,566,513 B2
(45) Date of Patent: Jul. 28, 2009

(54) SOLID ELECTROLYTE FUEL CELL WITH A MULTI-LAYER CATHODE FORMED OF A SOLID ELECTROLYTE AND ELECTRODE ADMIXTURE

(75) Inventors: Fumimasa Katagiri, Nagano (JP); Shigeaki Suganuma, Nagano (JP); Yasue Tokutake, Nagano (JP); Jun Yoshiike, Nagano (JP); Michio Horiuchi, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 221 days.

(21) Appl. No.: 11/602,975

(22) Filed: Nov. 22, 2006

(65) Prior Publication Data

US 2007/0166604 A1    Jul. 19, 2007

(30) Foreign Application Priority Data

Nov. 25, 2005    (JP)    ............................ P.2005-340343

(51) Int. Cl.
*H01M 4/90* (2006.01)
(52) U.S. Cl. .......................................... 429/41; 429/46
(58) Field of Classification Search ................... 429/33, 429/41, 46
See application file for complete search history.

(56) References Cited

U.S. PATENT DOCUMENTS

2005/0037251 A1    2/2005    Horiuchi et al.

2005/0214612 A1 *    9/2005    Visco et al. ................... 429/30

FOREIGN PATENT DOCUMENTS

| DE | 196 26 342 | 1/1998 |
| EP | 0 510 820 | 10/1992 |
| EP | 0 788 175 | 8/1997 |
| EP | 1 511 113 | 3/2005 |

OTHER PUBLICATIONS

A. Boudghene Stambouli et al., "Solid Oxide Fuel Cells (SOFCs): A Review Of An Environmentally Clean And Efficient Source Of Energy," Renewable & Sustainable Energy Reviews, Apr. 2, 2002; pp. 433-455.

* cited by examiner

*Primary Examiner*—Mark Ruthkosky
(74) *Attorney, Agent, or Firm*—Drinker Biddle & Reath LLP

(57) ABSTRACT

A solid electrolyte fuel cell including a cathode layer formed on one surface of a solid electrolyte layer and an anode layer formed on the other surface of the solid electrolyte layer, wherein the cathode layer is a multi-layer structure including at least two layers, the outermost layer constituting the multi-layer structure is a porous layer obtained by adding a pore-forming material which is gasified at the firing temperature for the formation of the cathode layer during the formation of the cathode layer by firing and has a mesh metal or wire metal for current collection embedded therein or fixed thereto and the innermost layer disposed in contact with the solid electrolyte layer is a dense layer obtained by firing free of pore-forming material during the formation of the cathode layer by firing.

3 Claims, 7 Drawing Sheets

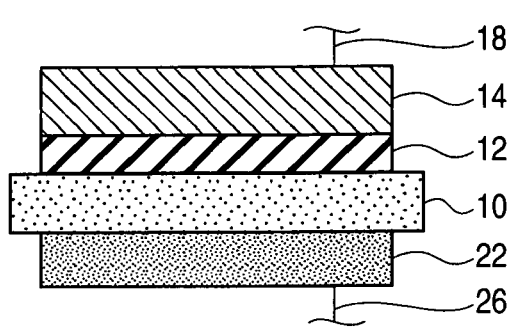
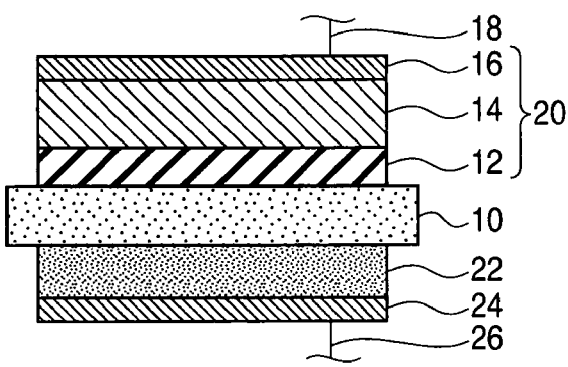
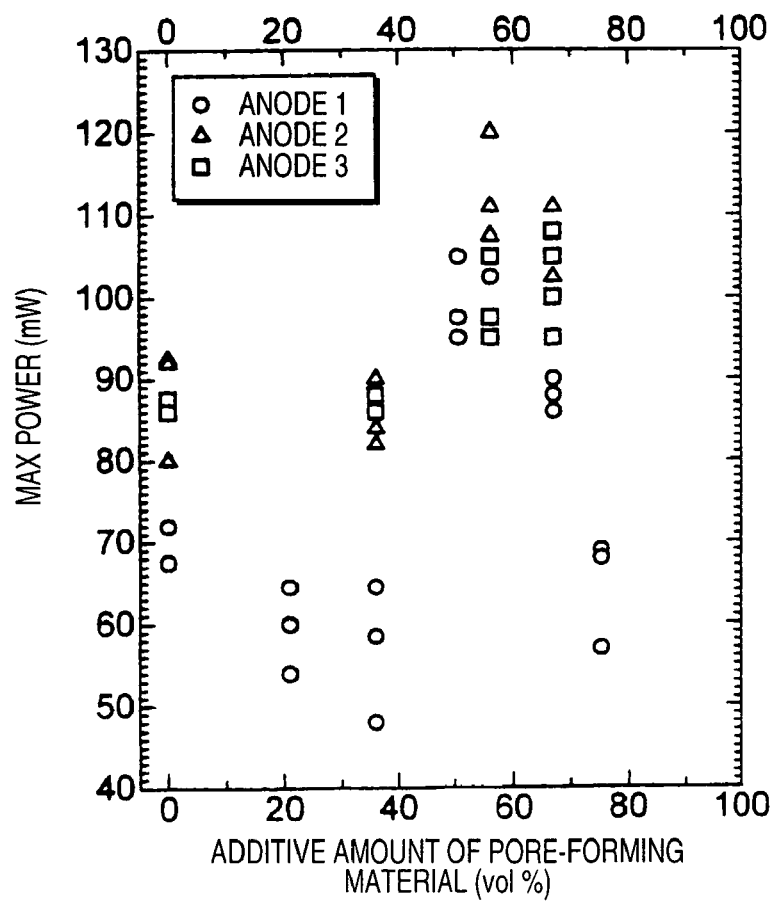

SOLID ELECTROLYTE FUEL CELL WITH A MULTI-LAYER CATHODE FORMED OF A SOLID ELECTROLYTE AND ELECTRODE ADMIXTURE

BACKGROUND OF THE INVENTION

The present invention relates to a solid electrolyte fuel cell and more particularly to a solid electrolyte fuel cell including a cathode layer formed on one surface of a solid electrolyte layer and an anode layer formed on the other surface of the solid electrolyte layer.

Patent Reference 1 proposes a simple fuel cell which can be disposed in or in the vicinity of burning flame to generate electricity. This fuel cell is shown in FIG. 8. A fuel cell 100 shown in FIG. 8 is a solid electrolyte fuel cell (hereinafter referred to as "solid electrolyte fuel cell 100") including a cathode layer 104 formed on one surface of a solid electrolyte layer 102 having a dense structure and an anode layer 110 formed on the other surface of-the solid electrolyte layer 102. The cathode layer 104 and the anode layer 110 each are in the form of a porous layer having mesh metals 106 and 112 embedded therein or fixed thereto, respectively. Extending from the mesh metals 106 and 112 are lead wires 108 and 114, respectively.

[Patent Reference 1] JP-A-2005-63686

The solid electrolyte fuel cell 100 shown in FIG. 8 can be disposed in such an arrangement that the anode layer 110 side surface thereof is in or in the vicinity of burning flame to generate electric power that can be drawn out through the lead wires 108 and 114.

However, when the solid electrolyte fuel cell 100 shown in FIG. 8 is repeatedly exposed to flame on the anode layer 110 side surface thereof, a phenomenon occurs that the electric power taken out through the lead wires 108, 114 gradually decreases, demonstrating that it lacks durability. Further, the electric power taken out through the lead wires 108, 114 is insufficient. It has thus been desired to enhance the durability and electric power of the solid electrolyte fuel cell 100 shown in FIG. 8.

The inventors thought that the reason for the insufficient durability of the solid electrolyte fuel cell 100 shown in FIG. 8 is the exfoliation of the cathode layer 104 of the porous layer and the dense solid electrolyte layer 102 from each other on their interface due to the difference in thermal expansion coefficient between them. The inventors then attempted to form the cathode layer by an electrode material and an electrolyte material in admixture in order to minimize the difference in thermal expansion coefficient between the cathode layer and the solid electrolyte layer.

In order to form a cathode layer by an electrode material and an electrolyte material in admixture, the mixing ratio of the electrode material and the electrolyte material is normally predetermined to be from 70:30 to 80:20. Then, the inventors prepared a solid electrolyte fuel cell including a cathode layer made of an electrode material and an electrolyte material at a mixing ratio of 50:50 having a mesh metal embedded therein provided on one surface of a dense solid electrolyte layer.

The solid electrolyte fuel cell thus prepared exhibits an enhanced durability but shows little or no enhancement of electric power output as compared with the solid electrolyte fuel cell 100 shown in FIG. 8. The reason for this phenomenon is presumably because the cathode layer formed by an electrode material and an electrolyte material at a mixing ratio of 50:50 has a dense structure that decreases the transfer resistance of oxygen ions to the dense solid electrolyte layer but decreases the area of the three-phase interface on which the gas such as oxygen, the electrode material and the electrolyte material come in contact with each other.

It is also made obvious that the solid electrolyte fuel cell thus prepared shows a deteriorated adhesion of the mesh metal due to the difference in thermal properties between the mesh metal embedded in the cathode layer and the electrode material.

SUMMARY OF THE INVENTION

It is therefore an aim of the invention to provide a solid electrolyte fuel cell which can provide an enhanced electric power when disposed in such an arrangement that the anode layer side surface thereof is in or in the vicinity of burning flame to generate electricity and can exhibit an enhanced durability as compared with a solid electrolyte fuel cell having a cathode layer formed in a dense structure.

The inventors made extensive studies of solution to the aforementioned problems. As a result, it is found that the electric power provided and the durability of the solid electrolyte fuel cell can be enhanced by arranging such that the cathode layer includes two layers wherein the outermost layer of the cathode layer is the form of a porous layer having a mesh metal for current collection embedded therein and the innermost layer of the cathode layer in contact with the solid electrolyte layer having a dense structure is in the form of a dense layer. The invention is thus worked out.

According to the present invention, there is provided with a solid electrolyte fuel cell including:

a solid electrolyte layer, a cathode layer formed on one surface of the solid electrolyte layer, and an anode layer formed on the other surface of the solid electrolyte layer, wherein the cathode layer is a multi-layer structure including at least two layers, the outermost layer constituting the multi-layer structure is a porous layer obtained by adding a pore-forming material which is gasified at the firing temperature for the formation of the cathode layer during the formation of the cathode layer by firing, and has a mesh metal or wire metal for current collection embedded therein or fixed thereto, and the innermost layer disposed in contact with the solid electrolyte layer is a dense layer obtained by firing free of pore-forming material during the formation of the cathode layer by firing.

In the invention, by the additive amount of the pore-forming material to a range of from 50 to 70 vol %, it is possible to enhance the maximum electric power of the solid electrolyte fuel cell.

Further, by forming the layers constituting the cathode layer from an electrolyte constituting the solid electrolyte layer and an electrode material in admixture, it is possible to minimize the difference in thermal expansion coefficient between the cathode layer and the solid electrolyte layer.

In particular, by arranging such that among the layers constituting the cathode layer, the layer disposed closer to the solid electrolyte layer has a greater solid electrolyte content, it is possible to further enhance the heat resistance of the solid electrolyte fuel cell.

Moreover, when the solid electrolyte fuel cell is exposed to flame on one surface thereof in the open atmosphere to generate electricity, the anode layer side surface thereof is exposed to flame, and the cathode layer side surface thereof is open to the atmosphere to allow generation of electricity.

Besides, when the additive amount of the pore-forming material to a range of less or equal to 10 vol %, the same effect is obtained. Further, it is preferable to use carbon-based pore-forming material (for example, graphite etc.) of which diameter is equal to or less than 5 µm.

The solid electrolyte fuel cell according to the invention can provide an enhanced electric power when disposed in such an arrangement that the anode layer side surface thereof is in or in the vicinity of burning flame to generate electricity and can exhibit an enhanced durability as compared with a solid electrolyte fuel cell having a cathode layer formed in a dense structure. The reason for the advantage of the solid electrolyte fuel cell of the invention is thought as follows.

In the solid electrolyte fuel cell according to the invention, the outermost layer constituting the -multi-layered cathode layer is in the form of a porous layer having a mesh metal or wire metal for current collection embedded therein or fixed thereto. In this arrangement, when the cathode layer is formed by firing, the difference in thermal properties between the electrode material constituting the cathode layer and the mesh metal or wire metal can be relaxed, making it possible to enhance the adhesion between the mesh metal or wire metal and the electrode material.

In accordance with the solid electrolyte fuel cell according to the invention, the area of the three-phase interface on which the gas such as oxygen, the electrode material and the electrolyte material come in contact with each other can be raised.

Further, in the solid electrolyte fuel cell according to the invention, the innermost layer disposed in contact with the solid electrolyte layer is a dense layer obtained by adding a pore-forming material which is gasified at the firing temperature for the formation of the cathode layer during the formation of the cathode layer by firing. In this arrangement, oxygen ions can easily move to the solid electrolyte layer on the interface of the dense layer of the cathode layer with the solid electrolyte layer.

Thus, the combined effect of the enhancement of adhesion of mesh metal or wire metal with electrode material, the rise of the area of the three-phase interface on which the gas such as oxygen, the electrode material and the electrolyte come in contact with each other and the facilitation of movement of oxygen ions to the solid electrolyte on the interface of dense layer of cathode layer with solid electrolyte layer makes it possible for the solid electrolyte fuel cell according to the invention to output a higher electric power than the related art solid electrolyte fuel cells and enhance its durability.

BRIEF DESCRIPTION OF THE DRAWINGS

FIG. 1A is a view illustrating an example of the solid electrolyte fuel cell according to the invention, and FIG. 1B is a sectional view of FIG. 1A.

FIG. 2 is a graph illustrating the relationship between the amount of pore-forming material to be incorporated in the porous layer paste in the formation of the porous layer 14 constituting the cathode layer 20 shown in FIG. 1 and the maximum output of the solid electrolyte fuel cell thus obtained.

DETAILED DESCRIPTION OF THE PREFERRED EMBODIMENTS

Figure 3A:
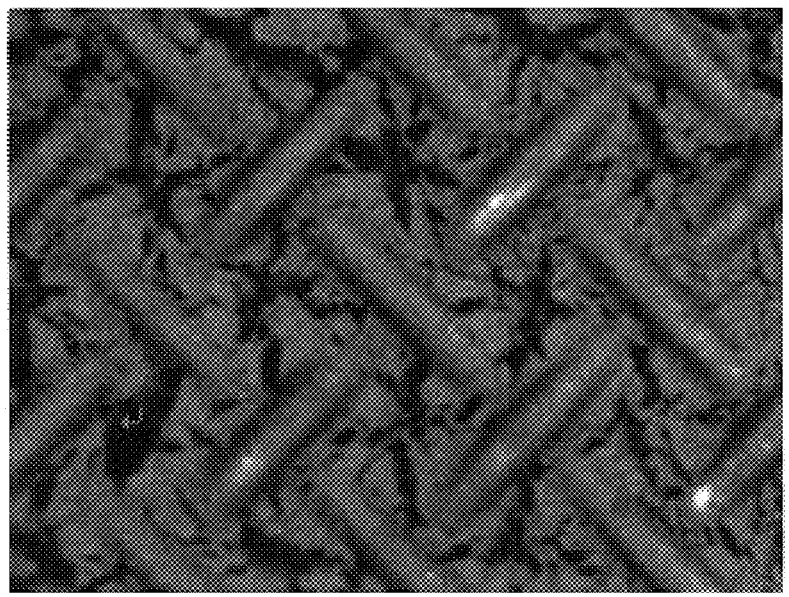
FIG. 3A depicts microphotograph of the surface of the porous layer 14 of the solid electrolyte fuel cell shown in FIG. 1.

An example of the solid electrolyte fuel cell according to the invention is shown in FIG. 1. The solid electrolyte fuel cell shown in FIG. 1 includes a cathode layer 20 formed on one surface of a solid electrolyte layer 10 and an anode layer 22 formed on the other surface of the solid electrolyte layer 10.

The solid electrolyte layer 10 is a dense structure. As the solid electrolyte constituting the solid electrolyte layer 10 there may be used any known solid electrolyte. Examples of the solid electrolyte employable herein are made of YSZ (yttria-stabilized zirconia), ScSz (scandia-stabilized zirconia), zirconia-based ceramics obtained by doping these zirconia with Ce, Al or the like, ceria-based ceramics such as SDC (samaria-doped ceria) and GDC (gadolia-doped ceria), and lanthanum gallate-based ceramics such as LSGM.

The solid electrolyte layer 10 can be obtained by firing a green sheet for solid electrolyte including a solid electrolyte at a predetermined temperature.

The cathode layer 20 formed on one surface of the solid electrolyte layer 10 is a multi-layered cathode layer 20 including layers 12, 14 wherein the layer 12 disposed in contact with the surface of the solid electrolyte layer 10 is in the form of a dense layer (hereinafter occasionally referred to as "dense layer 12"). The layer 14 laminated on the dense layer 12 is a porous layer (hereinafter occasionally referred to as "porous layer 14") having a mesh metal 16 made of platinum embedded therein or fixed thereto. The mesh metal 16 is adapted for current collection. Extending from the mesh metal 16 is a lead wire 18.

As the cathode layer electrode material from which the cathode layer 20 is prepared there may be used any known cathode layer electrode material. Examples of the cathode layer electrode material employable herein are made of manganite of lanthanum having an element belonging to the group II such as strontium (Sr) incorporated therein (e.g., lanthanum strontium manganite), and gallate acid or cobaltate compound (e.g., samarium strontium cobaltite, lanthanum strontium cobaltite).

The formation of the dense layer 12 and the porous layer 14 constituting the cathode layer 20 from the cathode layer electrode material and the electrolyte constituting the solid electrolyte layer 10 in admixture makes it possible to minimize the difference in thermal expansion coefficient between the cathode layer 20 and the solid electrolyte layer 10 and hence prevent the exfoliation of the solid electrolyte layer 10 and the cathode layer 20 from each other.

In particular, the content of the electrolyte to be incorporated in the dense layer 12 disposed in contact with the solid electrolyte layer 10 among the dense layer 12 and the porous layer 14 constituting the cathode layer 20 can be predetermined greater than that of the porous layer 14 to form the cathode layer 20 as an electrolyte-gradient layer and hence further enhance the heat resistance of the solid electrolyte fuel cell.

The porous layer 14 constituting the cathode layer 20 can be formed by forming a porous layer paste obtained by mixing a predetermined amount of a cathode electrode material and an electrolyte with a pore-forming material into a sheet, and then firing the sheet at a temperature of not lower than the gasification temperature of the pore-forming material. As the pore-forming material there is preferably used a carbon-based pore-forming material.

Further, the dense layer 12 constituting the cathode layer 20 can be obtained by mixing a predetermined amount of a cathode electrode material and an electrolyte free of pore-forming material to obtain a dense layer paste, forming the paste into a sheet, and then firing the sheet at a predetermined temperature.

The solid electrolyte fuel cell shown in FIG. 1 includes an anode layer 22 having a mesh metal 24 made of platinum embedded therein or fixed thereto formed on the other surface of the solid electrolyte layer 10. The anode layer 22 has a lead wire 26 extending from the mesh metal 24.

As the anode electrode material from which the anode layer 22 is prepared there may be used any known anode layer electrode material. Examples of the anode layer electrode material employable herein are made of cermets of nickel with yttria-stabilized zirconia-based, scandia-stabilized zirconia-based or ceria-based (e.g., SDC, GDC, YDC) ceramics. As the anode layer electrode material there may be used a sintered material mainly made of an electrically-conductive oxide (50 to 99 wt %). As the electrically-conductive oxide there may be used nickel oxide having lithium dissolved in solid state therein or the like. Due to its excellent oxidation resistance, this sintered material can prevent phenomena occurring due to the oxidation of the anode layer 22, e.g., drop of electricity generation efficiency or incapability of electricity generation due to the rise of the electrode resistivity of the anode layer 22 and exfoliation of the anode layer 22 from the solid electrolyte layer 10. An anode layer electrode material having a metal made of platinum element or oxide thereof incorporated in the sintered material in an amount of from 1 to 10 wt %, too, can form an anode layer 22 having a high electricity-generating capability.

The anode layer 22, too, can be formed by an anode layer electrode material and an electrolyte in admixture to minimize the difference in thermal expansion coefficient between the anode layer 22 and the solid electrolyte layer 10, making it possible to prevent the exfoliation of the solid electrolyte layer 10 and the anode layer 22 from each other.

The anode layer 22 can be formed by forming an anode layer paste obtained mixing a predetermined amount of an anode layer electrode material and an electrolyte into a sheet, and then firing the sheet at a predetermined temperature.

In order to produce the solid electrolyte fuel cell shown in FIG. 1, a sheet-like material made of the aforementioned dense layer paste, a sheet-like material made of the aforementioned porous layer paste and the mesh metal 16 having one end of the lead wire 18 welded thereto are laminated on one surface of the solid electrolyte layer 10 obtained by firing in this order. Subsequently, a sheet like material made of the aforementioned-anode layer paste and the mesh metal 24 having one end of the lead wire 26 welded thereto are laminated on the other surface of the solid electrolyte layer 10 in this order to obtain a laminate. Subsequently, the laminate thus obtained is fired at a temperature to obtain the desired solid electrolyte fuel cell. The firing temperature is defined to be a temperature at which the pore-forming material incorporated in the sheet-like material made of a pore-forming material is gasified.

In order to generate electricity using the solid electrolyte fuel cell shown in FIG. 1 thus obtained, the anode layer 22 side surface of the solid electrolyte fuel cell disposed in the open atmosphere is disposed in or in the vicinity of flame so that it is exposed to flame while the cathode layer 20 side surface of the solid electrolyte fuel cell is open to the atmosphere, making it possible to draw electricity through the lead wires 18, 26.

The electric power drawn from the solid electrolyte fuel cell shown in FIG. 1 through the lead wires 18, 26 can be remarkably enhanced as compared with solid electrolyte fuel cells the cathode layer of which is entirely in a dense or porous form. The durability of the solid electrolyte fuel cell shown in FIG. 1, too, can be enhanced as compared with solid electrolyte fuel cells the cathode layer of which is entirely in a dense form.

When the solid electrolyte fuel cell shown in FIG. 1 is disposed in the open atmosphere in such an arrangement that the surface of the anode layer 22 is in or in the vicinity of flame to generate electricity as previously mentioned, flame can be applied to the entire surface of the anode layer 22 because the solid electrolyte fuel cell shown in FIG. 1 is in flat form. Further, the disposition of the anode layer 22 opposed to flame makes it easy for hydrocarbons, hydrogen, radicals (OH, CH, $C_2$, $O_2H$, $CH_3$), etc. present in flame to be utilized also as fuel.

Moreover, when the solid electrolyte fuel cell is in flat form, flame can be completely blocked by the surface of the anode layer 22 so that flame cannot extend to the surface of the solid electrolyte fuel cell on the cathode layer 20 side surface. In this arrangement, the solid electrolyte fuel cell can be exposed to the atmosphere on the cathode layer 20 side surface thereof, making it easy for the cathode layer 20 to utilize oxygen in the atmosphere. Further, a gas containing oxygen (e.g., air, oxygen-rich gas) may be blown onto the cathode layer 20 so that the cathode layer 20 can utilize oxygen efficiently.

Thus, the solid electrolyte fuel cell is disposed in or in the vicinity of flame. However, the solid electrolyte fuel cell is preferably disposed in reducing flame which is in the vicinity of the root of flame. The disposition of the solid electrolyte fuel cell in reducing flame allows efficient utilization of hydrocarbons, hydrogen, radicals, etc. present in reducing flame as fuel. Even when the anode layer 22 including an anode layer electrode material which can be easily oxidized and deteriorated is used, the durability of the solid electrolyte fuel cell can be kept good.

As the fuel there may be used any material which can be combusted and oxidized with flame (combustible material).

The relationship between the amount of the pore-forming material incorporated in the porous layer paste constituting the porous layer 14 of the cathode layer 20 and the electric power provided by the solid electrolyte fuel cell thus obtained is graphically shown in FIG. 2.

In the graph of FIG. 2, the amount of carbon-based pore-forming material to be incorporated in the porous layer paste is plotted as additive amount of pore-forming material as abscissa and the maximum output of the solid electrolyte fuel cell thus obtained as ordinate. The graph of FIG. 2 depicts the maximum output of solid electrolyte fuel cells obtained from different anode layer electrode materials constituting the anode layer 22.

As can be seen in the graph of FIG. 2, when the amount of pore-forming material to be incorporated in the porous layer paste is from 50 to 70 vol %, the maximum output of the solid electrolyte fuel cell thus obtained can be enhanced.

While the foregoing description is made with reference to the case where the cathode layer 20 and the anode layer 22 have mesh metal gauzes 16, 24 provided therein, respectively, a wire metal may be used. While the cathode layer 20 of the solid electrolyte fuel cell shown in FIG. 1 includes two layers, the cathode layer 20 may include three or more layers.

EXAMPLE 1

(1) Preparation of Solid Electrolyte Fuel Cell

As the solid electrolyte layer 10 there is used a $Sm_{0.2}Ce_{0.8}O_{1.9}$ (samaria-doped ceria: SDC) ceramic substrate having a thickness of 180 μm and a diameter ϕ of 15 mm obtained by stamping a circular sheet from a green sheet formed by doctor blade method which is a kind of tape casting method, and then firing the sheet at 1,300° C.

An anode layer paste obtained by mixing 20 wt % of SDC, 5 wt % of $Rh_2O_3$ (rhodium oxide) and 8 mol % of Li—$NiO_2$ is then sheet-printed as a sheet-like material constituting the anode layer 22 (spread area: 1.3 cm$^2$) on one surface of the ceramic substrate as solid electrolyte layer 10 (area: 1.8 cm$^2$).

Separately, a dense layer paste made of $Sm_{0.5}Sr_{0.5}CoO_3$ (samarium strontium cobaltite: SSC) having 50 wt % of SDC incorporated therein is sheet-printed as a sheet-like material constituting the dense layer 12 of the cathode layer 20 on the other surface of the ceramic substrate (spread area: 1.3 cm$^2$).

Further, a porous layer paste made of SSC having 55 vol % of a carbon-based pore-forming material and 30 wt % of SDC incorporated therein is sheet-printed as a sheet-like material constituting the porous layer 14 of the cathode layer 20 on the sheet-like material constituting the dense layer 12 (spread area: 1.3 cm$^2$).

Subsequently, mesh metals 16, 24 formed by welding a platinum wire are embedded in the sheet-like material constituting the outermost layer of -the cathode layer 20 and the anode layer 22, respectively. The laminate is then fired at 1,200° C. for 1 hour in the atmosphere to obtain the solid electrolyte fuel cell shown in FIG. 1.

(2) Surface Observation

The results of observation of the surface of the porous layer 14 of the cathode layer 20 of the solid electrolyte fuel cell shown in FIG. 1 thus obtained under microscope are shown in FIG. 3A. The results of observation of the same surface of the porous layer 14 are shown in FIG. 3B.

Figure 3B:
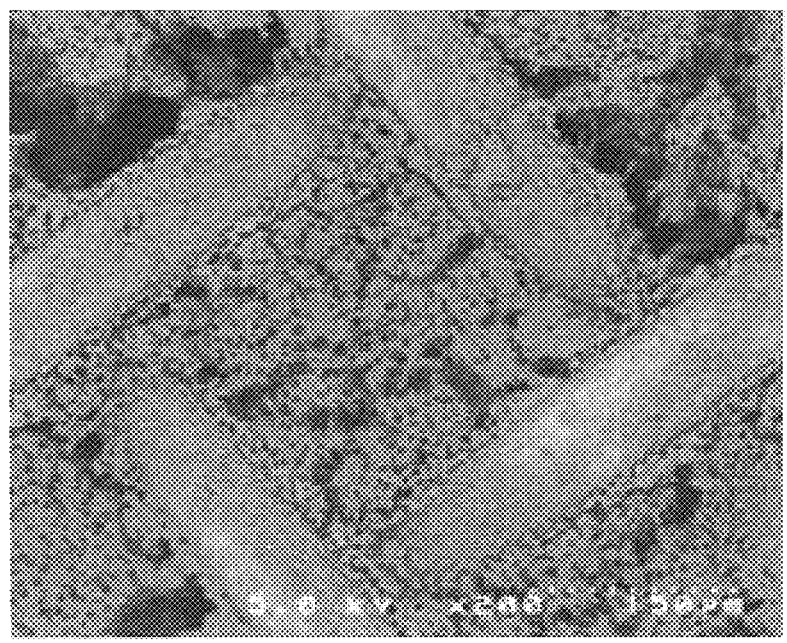
FIG. 3B depicts electron microphotograph thereof.

As can be seen in FIGS. 3A and 3B, the adhesion between the platinum wire constituting the mesh metal 16 and the porous layer 14 is good.

COMPARATIVE EXAMPLE 1

(1) Preparation of Solid Electrolyte Fuel Cell

Figure 4A:
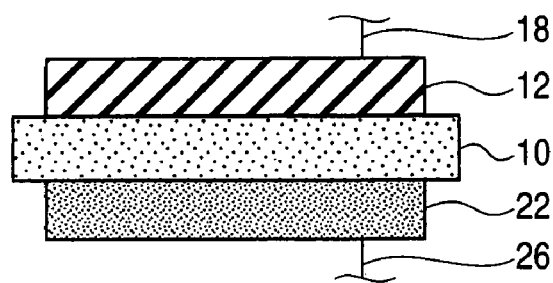
FIG. 4A is a view of a solid electrolyte fuel cell the cathode layer 20 of which is formed only a dense layer 12.
Figure 4B:
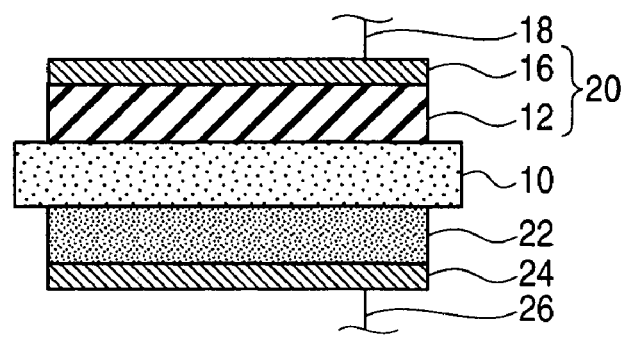
FIG. 4B is a sectional view of FIG. 4A

A solid electrolyte fuel cell is prepared in the same manner as in Example 1 except that the cathode layer 20 is formed by a dense layer paste alone free of porous layer Paste. As shown in FIG. 4, the cathode layer 20 of the solid electrolyte fuel cell thus obtained is formed only by a dense layer 12 and a mesh metal 16.

(2) Surface Observation

Figure 5A:
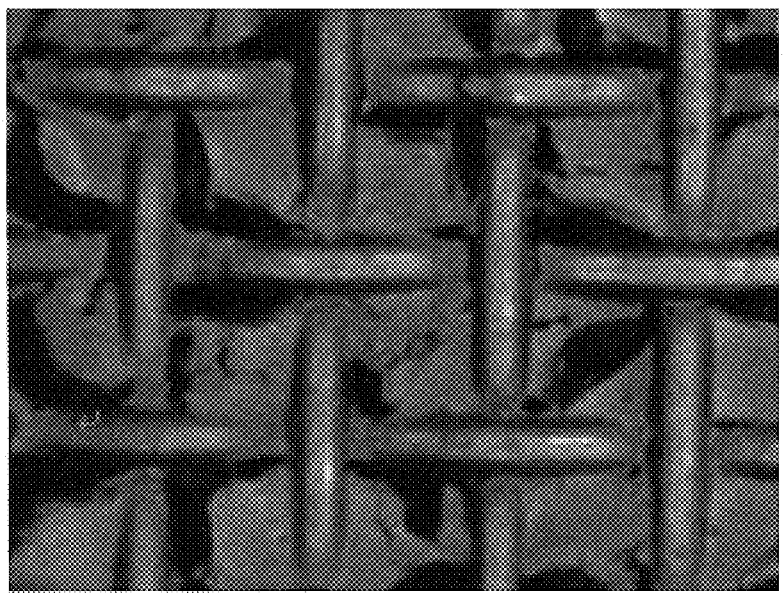
FIG. 5A depicts microphotograph of the surface of the dense layer 12 of the solid electrolyte fuel cell shown in FIG. 4.

The results of observation of the surface of the dense layer 12 of the cathode layer 20 of the solid electrolyte fuel cell shown in FIG. 4 thus obtained under microscope are shown in FIG. 5A. The results of observation of the same surface of the dense layer 12 are shown in FIG. 5B.

Figure 5B:
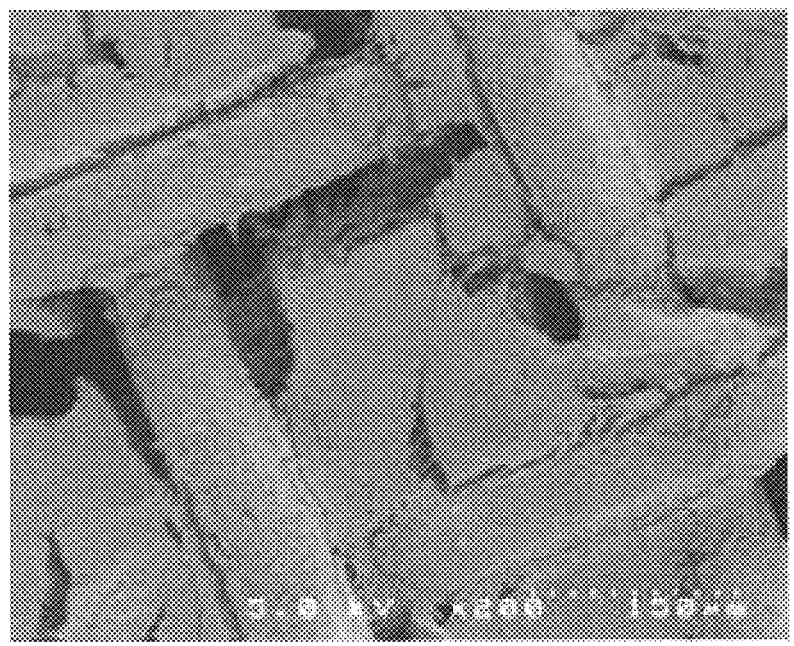
FIG. 5B depicts electron microphotograph thereof.

As can be seen in the comparison of FIGS. 5A and 5B with FIGS. 3A and 3B, a large void is formed around the platinum wire constituting the mesh metal 16 in the dense layer 12 constituting the cathode layer 20 of the solid electrolyte fuel cell shown in FIG. 4, demonstrating that the adhesion between the platinum wire and the dense layer 12 is insufficient.

COMPARATIVE EXAMPLE 2

A solid electrolyte fuel cell is prepared in the same manner as in Example 1 except that the cathode layer 20 is formed by a porous layer paste alone free of dense layer paste. The cathode layer 20 of the solid electrolyte fuel cell thus obtained is formed only by a porous layer. 14 and a mesh metal 16.

EXAMPLE 2

The solid electrolyte fuel cells obtained in Example 1 and Comparative Example 1 and 2 are each then examined for electricity generation properties by applying a premixed flame from a burner using a 6.5% concentration butane gas as a fuel to the surface thereof on the anode layer 22 side surface thereof. The results are shown in FIG. 6.

Figure 6:
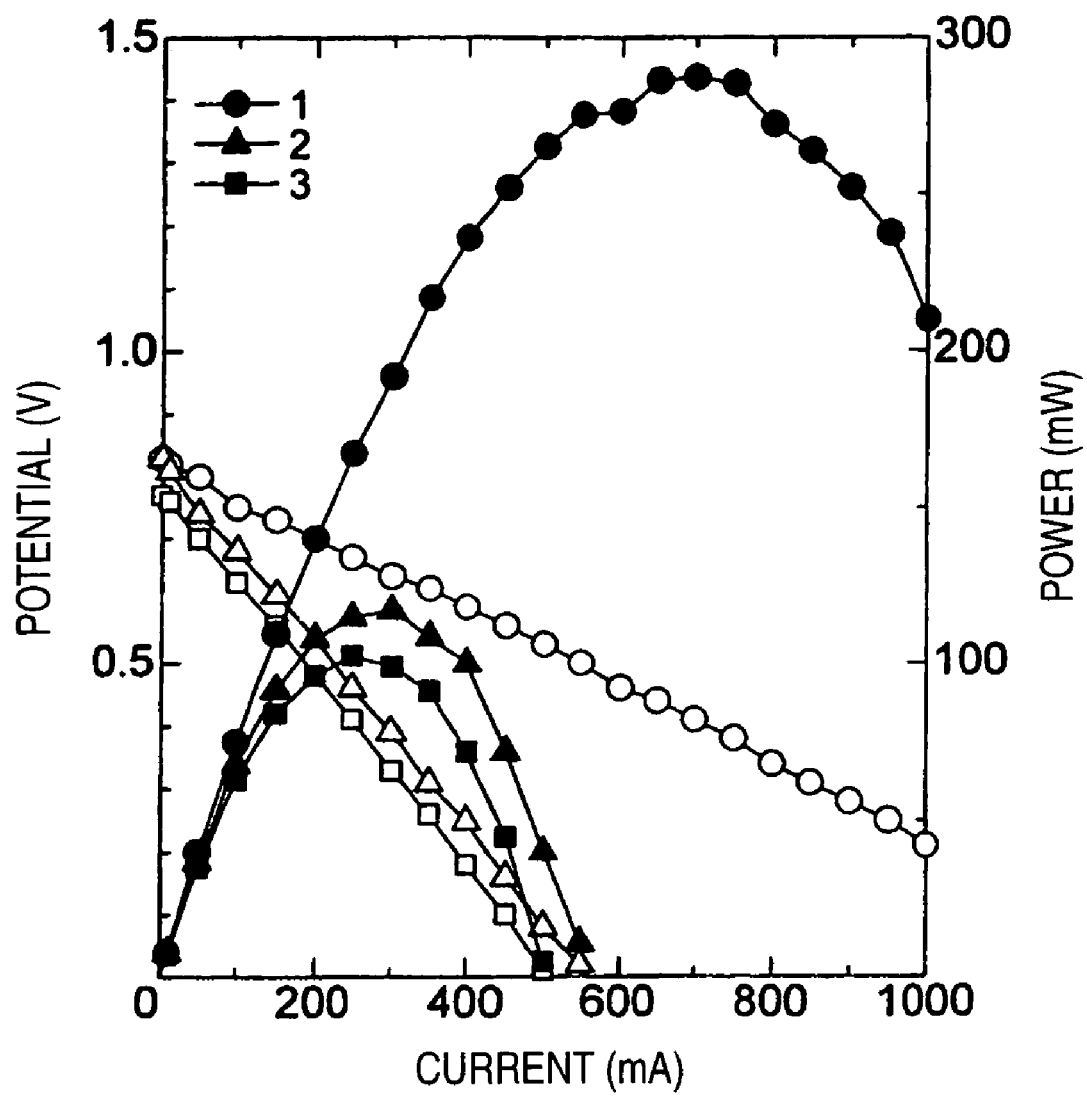
FIG. 6 is a graph illustrating the results of electricity generation properties examined on solid electrolyte fuel cells.

In FIG. 6, the black mark indicates the electric power [Power (mW)] corresponding to electric current and the white mark indicates the potential [Potential (V)] corresponding to electric current. In FIG. 6, No. 1 indicates the results of the solid electrolyte fuel cell of Example 1 (including a cathode layer 20 formed by a dense layer 12, a porous layer 14 and a mesh metal 16) and No. 2 indicates the results of the solid electrolyte fuel cell of Comparative Example 1 (including a cathode layer 20 formed only by a dense layer 12 and a mesh metal 16). Further, No. 3 in FIG. 6 indicates the results of the solid electrolyte fuel cell of Comparative Example 2 (including a cathode layer 20 formed only by a porous layer 14 and a mesh metal 16).

As can be seen in FIG. 6, the electricity generation properties of the solid electrolyte fuel cell of Example 1 include an open circuit voltage (OCV) of 0.82 V at maximum (intercept in the axis of the Potential) and a maximum output of 290 mW. On the other hand, the solid electrolyte fuel cells of Comparative Examples 1 and 2 each exhibited a maximum output of about 100 mW at highest.

As can be seen in the foregoing description, the solid electrolyte fuel cell of Example 1 can give a maximum output as great as not lower than twice that of the solid electrolyte fuel cells of Comparative Examples 1 and 2.

EXAMPLE 3

The solid electrolyte fuel cells obtained in Example 1 and Comparative Example 2 are each examined for electricity generation properties by applying a premixed flame from a burner using a 6.5% concentration butane gas as a fuel to the surface thereof on the anode layer 22 side surface thereof. Thereafter, the solid electrolyte fuel cells are each sufficiently separated from flame so that they are entirely allowed to cool to room temperature, and then repeatedly subjected five times to procedure involving the application of premixed flame from a burner to the anode layer 22 side surface thereof so that they are each subjected to performance deterioration test by thermal shock. The results are shown in FIG. 7.

Figure 7B:
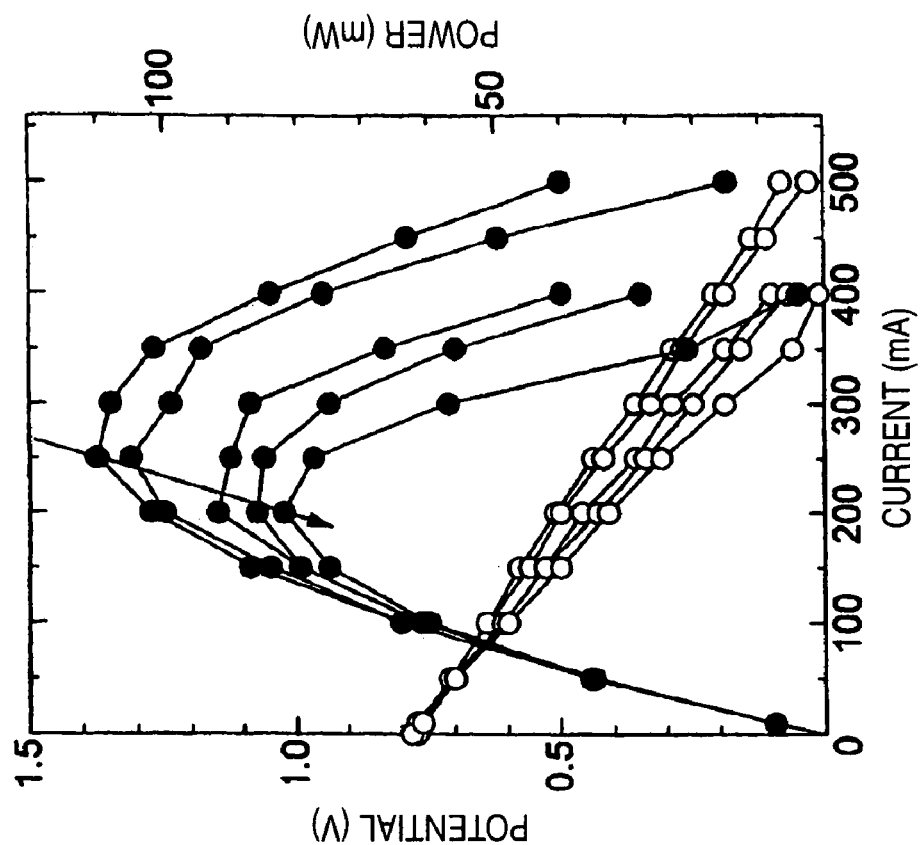
FIGS. 7A and 7B are graphs illustrating the results of electricity generation properties examined on thermally shocked solid electrolyte fuel cells.
Figure 7A:
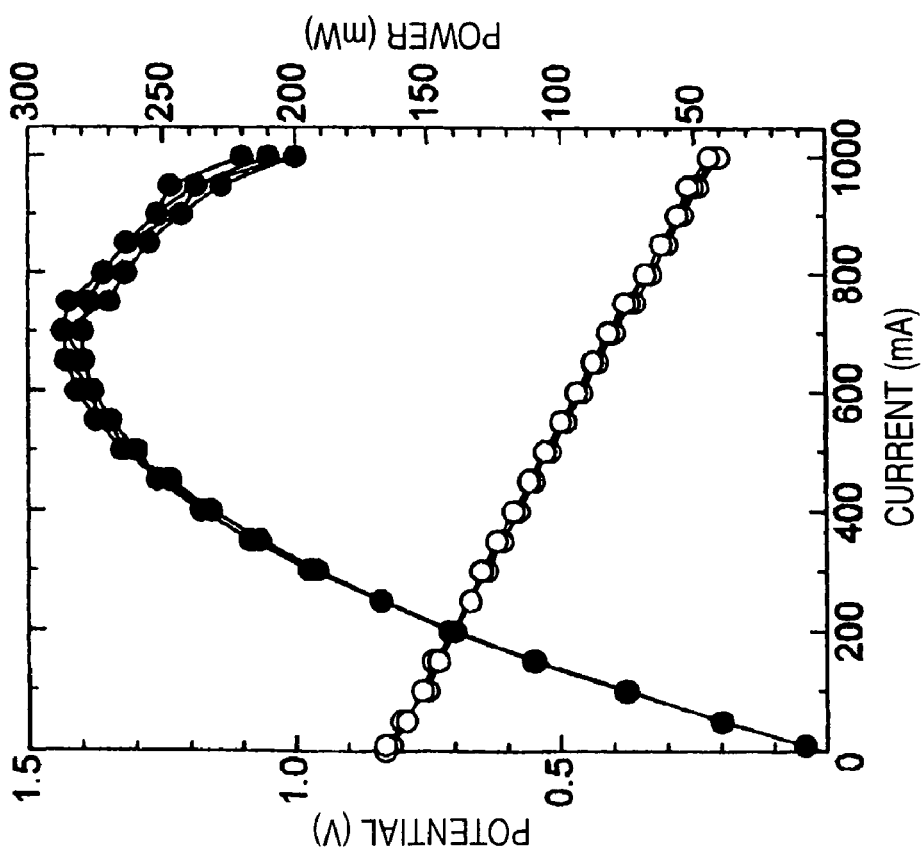
Figure 8:
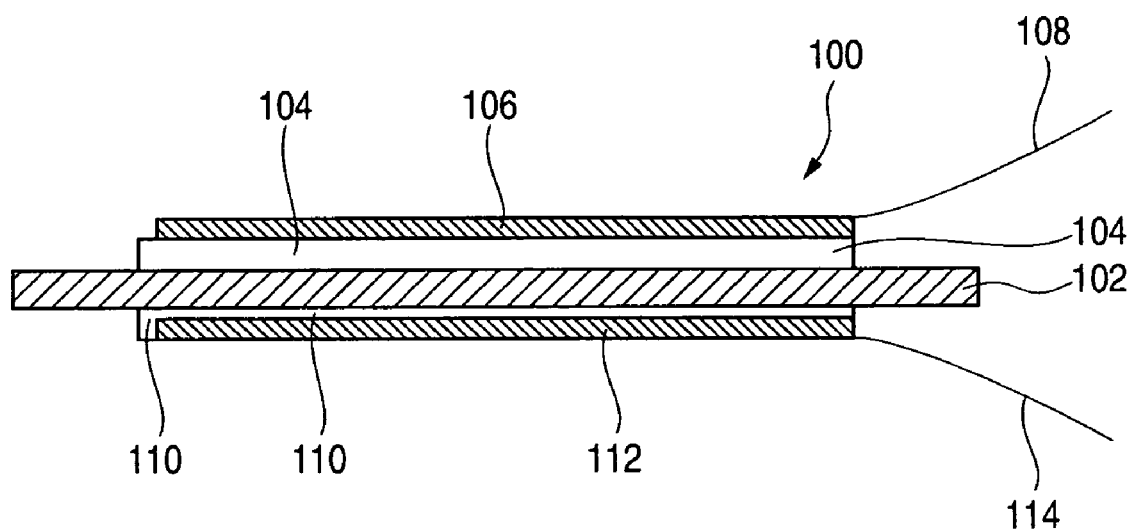
FIG. 8 is a sectional view illustrating a related art solid electrolyte fuel cell.

FIG. 7A is a graph illustrating the electricity generation properties of the solid electrolyte fuel cell obtained in Example 1. The solid electrolyte fuel cell of Example 1 is recognized to have little deterioration of electricity generation properties even when given thermal shock five times.

On the other hand, the solid electrolyte fuel cell obtained in Comparative Example 2 showed some deterioration of electricity generation properties every thermal shock as shown in FIG. 7B wherein the direction of deterioration of output is represented by the arrow.

What is claimed is:

1. A solid electrolyte fuel cell comprising:

a solid electrolyte layer, a cathode layer formed on one surface of the solid electrolyte layer, and an anode layer formed on the other surface of the solid electrolyte layer, wherein the cathode layer is a multi-layer structure including at least two layers, the outermost layer constituting the multi-layer structure is a porous layer obtained by adding a pore-forming material which is gasified at the firing temperature for the formation of the cathode layer during the formation of the cathode layer by firing, and has a mesh metal or wire metal for current collection embedded therein or fixed thereto, and the innermost layer disposed in contact with the solid electrolyte layer is a dense layer obtained by firing free of pore-forming material during the formation of the cathode layer by firing, wherein the layers constituting the cathode layer are formed by an electrolyte constituting the solid electrolyte layer and an electrode material in admixture, and wherein among the layers constituting the cathode layer, the layer disposed closer to the solid electrolyte layer has a greater solid electrolyte content.

2. The solid electrolyte fuel cell as defined in claim 1, wherein the addive amount of the pore-forming material is from 50 to 70 vol %.

3. The solid electrolyte fuel cell as defined in claim 1, wherein when the solid electrolyte fuel cell is exposed to flame on one surface thereof in the open atmosphere to generate electricity, the anode layer side surface thereof is exposed to flame, and the cathode layer side surface thereof is open to the atmosphere.

* * * * *